United States Patent
Hatanaka et al.

(10) Patent No.: US 10,308,109 B2
(45) Date of Patent: Jun. 4, 2019

(54) RESINOUS FILLER PORT

(71) Applicant: Sumitomo Riko Company Limited, Komaki-shi, Aichi (JP)

(72) Inventors: Kazuki Hatanaka, Komaki (JP); Makoto Shimojo, Komaki (JP); Tomoyuki Fukuyasu, Komaki (JP); Atsuo Miyajima, Komaki (JP)

(73) Assignee: Sumitomo Riko Company Limited, Komaki (JP)

( * ) Notice: Subject to any disclaimer, the term of this patent is extended or adjusted under 35 U.S.C. 154(b) by 54 days.

(21) Appl. No.: 15/340,631

(22) Filed: Nov. 1, 2016

(65) Prior Publication Data

US 2017/0050513 A1 Feb. 23, 2017

Related U.S. Application Data

(63) Continuation of application No. PCT/JP2016/056443, filed on Mar. 2, 2016.

(30) Foreign Application Priority Data

Mar. 16, 2015 (JP) ................................ 2015-051569

(51) Int. Cl.
*B60K 15/035* (2006.01)
*B60K 15/04* (2006.01)
(Continued)

(52) U.S. Cl.
CPC ...... *B60K 15/03519* (2013.01); *B60K 15/035* (2013.01); *B60K 15/03504* (2013.01);
(Continued)

(58) Field of Classification Search
CPC ........ B60K 15/03519; B60K 15/03504; B60K 15/035; B60K 15/04; B60K 2015/03552;
(Continued)

(56) References Cited

U.S. PATENT DOCUMENTS 5,404,906 A * 4/1995 Aoshima .......... B60K 15/03504
123/519
5,816,214 A * 10/1998 Kinugasa ................ B08B 15/00
123/198 E
(Continued)

FOREIGN PATENT DOCUMENTS

AR 038463 A1 1/2005
AU 2003200247 A1 8/2003
(Continued)

OTHER PUBLICATIONS

May 31, 2016 Written Opinion issued in International Patent Application No. PCT/JP2016/056443.
(Continued)

*Primary Examiner* — Hung Q Nguyen
*Assistant Examiner* — Brian P Monahon
(74) *Attorney, Agent, or Firm* — Oliff PLC

(57) ABSTRACT

The resinous filler port includes: a filler-port body including a nozzle insertion port through which a filler nozzle is insertable, a fuel supply port supplying a fuel supplied from the filler nozzle to a fuel tank by way of a filler tube, and a vapor inlet port letting flow in vapors arising from the fuel and passing through a breather tube from a side of the fuel tank; a joint formed to penetrate through from one of opposite ends thereof to another one of the opposite ends, fitted undetachably into and around the vapor inlet port at the one of the opposite ends, and connected with the breather tube at the other one of the opposite ends; and a flow control valve accommodated inside the joint, and controlling a flow volume of the vapors flowing into the filler-port body from the breather tube.

7 Claims, 3 Drawing Sheets

(51) Int. Cl.
*F02M 37/00* (2006.01)
*F02M 25/08* (2006.01)
*F16L 37/38* (2006.01)

(52) U.S. Cl.
CPC ......... *B60K 15/04* (2013.01); *F02M 25/0836* (2013.01); *F02M 25/0872* (2013.01); *F02M 37/00* (2013.01); *F02M 37/0017* (2013.01); *B60K 2015/03552* (2013.01); *F16L 37/38* (2013.01)

(58) Field of Classification Search
CPC ........... F02M 37/0017; F02M 25/0872; F02M 25/0836; F02M 37/00; F16L 37/38
See application file for complete search history.

(56) References Cited

U.S. PATENT DOCUMENTS

| | | | | |
|---|---|---|---|---|
| 5,850,819 A * | 12/1998 | Kunimitsu | ........... | F02M 25/089 123/520 |
| 6,354,280 B1 * | 3/2002 | Itakura | ............. | B60K 15/03504 123/198 D |
| 6,390,124 B1 * | 5/2002 | Kido | .................... | B21C 37/065 123/516 |
| 6,397,884 B1 * | 6/2002 | Miyajima | .......... | F02M 25/0872 137/543.23 |
| 6,609,503 B1 * | 8/2003 | Nakagawa | ............... | B62J 35/00 123/509 |
| 6,880,593 B1 * | 4/2005 | Swane | .................... | B29C 66/61 141/286 |
| 7,428,914 B2 * | 9/2008 | Kaneko | .................... | F16K 24/04 123/516 |
| 7,552,745 B2 * | 6/2009 | Nishiyama | ............... | F16L 37/40 137/540 |
| 9,937,785 B2 * | 4/2018 | Shimokawa | ..... | B60K 15/03519 |
| 2003/0140970 A1 * | 7/2003 | Benjey | ............. | B60K 15/03504 137/587 |
| 2005/0005998 A1 * | 1/2005 | Miura | .................... | B60K 15/04 141/382 |
| 2005/0115615 A1 * | 6/2005 | Takayanagi | ........ | F02M 25/0872 137/515 |
| 2005/0205160 A1 * | 9/2005 | Ganachaud | ............ | B60K 15/04 141/351 |
| 2005/0257839 A1 | 11/2005 | Kaneko et al. | | |
| 2006/0185739 A1 * | 8/2006 | Niki | ........................ | F16L 37/40 137/543.23 |
| 2007/0295312 A1 * | 12/2007 | Kaneko | .............. | F02M 25/0836 123/510 |
| 2008/0121449 A1 * | 5/2008 | Fujimura | .......... | F02M 35/10039 180/68.3 |
| 2008/0190936 A1 * | 8/2008 | Kobayashi | ....... | B60K 15/03177 220/564 |
| 2009/0031997 A1 * | 2/2009 | Makino | .................. | F02M 33/08 123/519 |
| 2013/0187378 A1 * | 7/2013 | Sui | ........................ | B60K 15/035 285/290.1 |
| 2015/0021907 A1 * | 1/2015 | Asai | .................... | F02M 37/00 285/284.1 |
| 2015/0233575 A1 * | 8/2015 | Tsumagari | ............. | F23D 11/445 431/208 |
| 2015/0239339 A1 * | 8/2015 | Nakamura | .............. | B60K 15/04 285/355 |

FOREIGN PATENT DOCUMENTS

| | | |
|---|---|---|
| CA | 2417766 A1 | 7/2003 |
| DE | 60300398 T2 | 3/2006 |
| EP | 1332906 A1 | 8/2003 |
| EP | 1548270 A1 | 6/2005 |
| JP | H02-94980 U | 7/1990 |
| JP | H08-270429 A | 10/1996 |
| JP | 2003-028010 A | 1/2003 |
| JP | 2003-269267 A | 9/2003 |
| JP | 2005-163836 A | 6/2005 |
| JP | 2006-070917 A | 3/2006 |
| JP | 3775656 B2 | 5/2006 |
| JP | 2006-234045 A | 9/2006 |
| JP | 2014-069619 A | 4/2014 |
| MX | PA03001008 A | 8/2003 |
| TW | 200302176 A | 8/2003 |
| WO | WO 2014073279 A1 * | 5/2014 ............ F23D 11/408 |

OTHER PUBLICATIONS

Sep. 6, 2018 Office Action issued in Japanese Patent Application No. 2015-051569.
Sep. 30, 2018 Office Action issued in Chinese Patent Application No. 201680003993.5.
May 31, 2016 Search report issued in in International Patent Application No. PCT/JP2016/056443.

\* cited by examiner

RESINOUS FILLER PORT

CROSS REFERENCE TO RELATED APPLICATIONS

The present application is a Continuation Application of International Application No. PCT/JP2016/056443, filed on Mar. 2, 2016, which is incorporated herein by reference. The present invention is based on Japanese Patent Application No. 2015-051569, filed on Mar. 16, 2015, the entire contents of which are incorporated herein by reference.

BACKGROUND OF THE INVENTION

1. Field of the Invention

The present invention relates to a resinous filler port.

2. Description of the Related Art

Japanese Patent Gazette No. 3775656, Japanese Unexamined Patent Publication (KOKAI) Gazette No. 2006-234045, Japanese Unexamined Patent Publication (KOKAI) Gazette No. 2003-269267 set forth to provide a connector controlling a flow volume of vapors, which arise from a fuel, in a breather line, in which the vapors distribute from a fuel tank to a filler port in the fuel supply system of an automobile. The connectors set forth in Japanese Patent Gazette No. 3775656 and Japanese Unexamined Patent Publication (KOKAI) Gazette No. 2006-234045 are connected at one of the opposite ends with a connector pipe disposed in the fuel tank, and are connected at another one of the opposite ends with an end of a breather tube that connects between the connectors and a filler port. The connectors comprise a connector body into which the connector pipe can be inserted from one of the opposite end sides and around which the breather tube can be fitted, a retainer for making the connector pipe detachable to and from the connector body, and a valve element disposed inside the connector body.

Moreover, the connector set forth in Japanese Unexamined Patent Publication (KOKAI) Gazette No. 2003-269267 is provided in the middle of a breather line, is connected at one of the opposite ends with a first breather tube that connects between the connector and a fuel tank, and is further connected at another one of the opposite ends with a second breather tube that connects between the connector and a filler port. The connector controls a flow volume of vapors resulting from a fuel.

SUMMARY OF THE INVENTION

However, in the conventional techniques known heretofore, the connectors, which are different from members on a side of the fuel tank and from the filler port, have a function of controlling the flow volume of vapors, which arise from the fuel, in the breather line. Since the connectors possess the function of controlling the flow volume of the fuel vapors, another connector, which serves as a member that is distinct from the members on a side of the fuel tank and from the filler port, has become necessary.

It is therefore an object of the present invention to provide a resinous filler port making it possible to make a connector, which has a function of controlling a flow volume of vapors resulting from a fuel, needless in a breather line.

A resinous filler port according to the present invention comprises:

a filler-port body made of resin, and including a nozzle insertion port through which a filler nozzle is insertable, a fuel supply port supplying a fuel supplied from the filler nozzle to a fuel tank by way of a filler tube, and a vapor inlet port letting flow in vapors arising from the fuel and passing through a breather tube from a side of the fuel tank;

a joint made of resin, and formed to penetrate through from one of opposite ends thereof to another one of the opposite ends, fitted undetachably into and around the vapor inlet port at the one of the opposite ends, and connected with the breather tube at the other one of the opposite ends; and a flow control valve accommodated inside the joint, and controlling a flow volume of the vapors flowing into the filler-port body from the breather tube.

The joint is fitted integrally into and around the filler-port body, while accommodating the flow control valve for adjusting the flow volume of vapors arising from the fuel in the interior. Thus, the resinous filler port itself comprises the built-in flow control valve. Therefore, it is not necessary for another member, which is distinct from members on a side of the fuel tank and from the filler port, to have any flow control valve; namely, no dedicated or single-purpose distinct component part becomes necessary at all.

Moreover, the joint accommodating the flow control valve therein is fitted undetachably into and around the vapor inlet port of the filler-port body. That is, the joint is connected at the other one of the opposite ends with the breather tube, an independent or separate constituent element; and is made integral with the filler-port body at the one of the opposite ends. Since the joint is thus fitted undetachably into and around the filler-port body, a component part equivalent to any retainer becomes unnecessary so that the number or quantity of the component parts becomes less, compared with such a construction as the joint is made detachable to and from the filler-port body.

DESCRIPTION OF THE EMBODIMENTS (First Embodiment)

(1) Construction of Fuel Line 1

Figure 1:
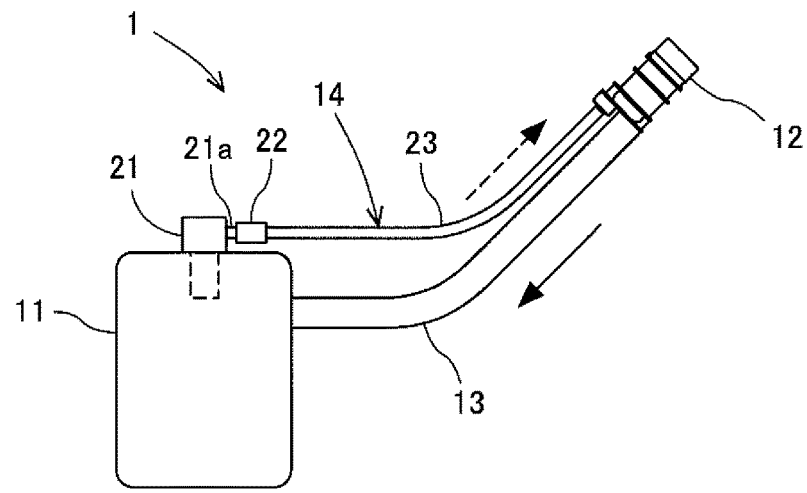
FIG. 1 is a diagram of a fuel line.

A construction of a fuel line 1 will be hereinafter described with reference to FIG. 1. The fuel line 1 is a line extending from a resinous filler port 12 to an internal combustion engine (not shown) in an automobile. Note however that, in the present embodiment, descriptions will be made on an intermediate part of the fuel line 1 from the resinous filler port 12 to a fuel tank 11.

The fuel line 1 comprises the fuel tank 11, the resinous filler port 12, a filler tube 13, and a breather line 14. The fuel tank 11 stores or reserves a liquid fuel, such as gasoline, therein. The liquid fuel stored or reserved in the fuel tank 11 is supplied to a not-shown internal combustion engine, and is then used to drive the internal combustion engine. The resinous filler port 12 is disposed adjacent to an automotive outer surface into which a filler nozzle (not shown) can be inserted. A not-shown filler cap is attached to the resinous filler port 12.

The filler tube 13 connects the intermediate part from the resinous filler port 12 to the fuel tank 11. The filler nozzle is inserted into the resinous filler port 12, the liquid fuel is then supplied from the filler nozzle, and thereby the liquid fuel passes through the filler tube 13 to be stored or reserved in the fuel tank 11. Note herein that the liquid fuel is stored or reserved in the filler tube 13, the liquid fuel then touches the leading end of the filler nozzle, and thereby the supply of the liquid fuel by the filler nozzle stops automatically.

The breather line 14 connects the fuel tank 11 with the resinous filler port 12. The breather line 14 is a line for discharging vapors, which arises from the liquid fuel within the fuel tank 11, to the exterior of the fuel tank 11 when the liquid fuel is supplied to the fuel tank 11 by way of the filler tube 13.

The breather line 14 includes a cut-off valve device 21, a connector 22, and a breather tube 23. The cut-off valve device 21 is arranged in an upper part of the fuel tank 11, and discharges vapors, which result from the fuel within the fuel tank 11, toward the resinous filler port 12 when being put in an open state. The cut-off valve device 21 is provided with a connector pipe 21a made of metal. The connector 22 is joined to the connector pipe 21a. The connector 22 is provided with such a construction as any flow control valve is excluded from the conventional connector disclosed in Japanese Patent Gazette No. 3775656, and the like, for instance. That is, the connector 22 is disposed so as to be detachable to and from the connector pipe 21a. The breather tube 23 connects the connector 22 with the resinous filler port 12.

(2) Detailed Construction of Resinous Filler Port 12

Figure 2:
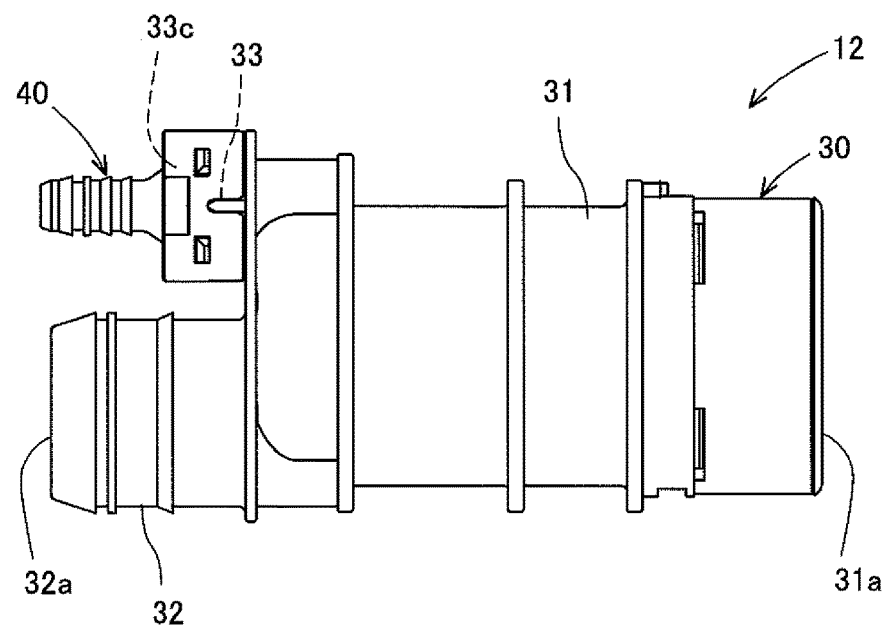
FIG. 2 is a side-face diagram of a resinous filler port.
Figure 3:
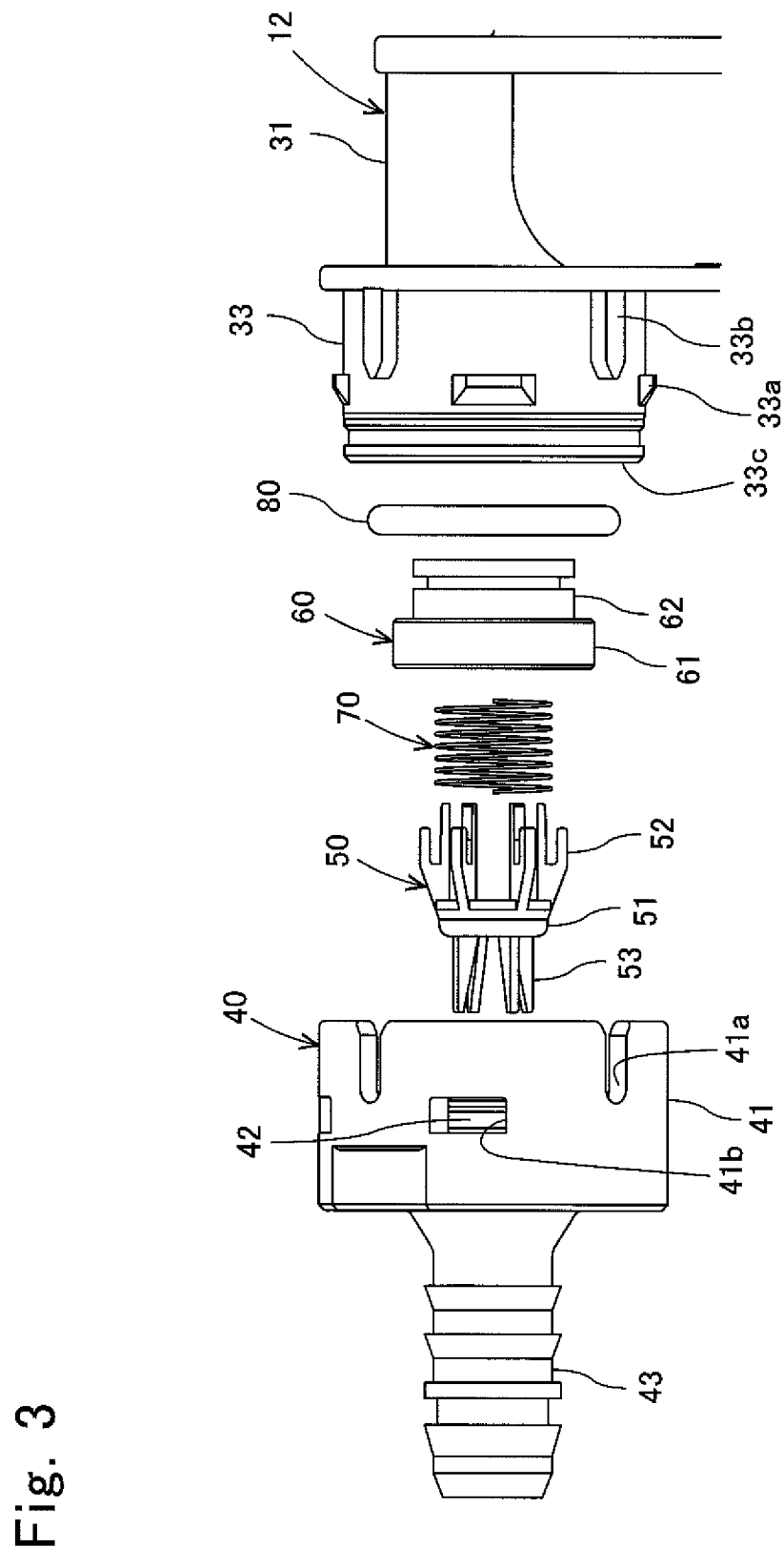
FIG. 3 is an enlarged exploded diagram of a state where a tubular fit-in portion, joint, flow control valve, spring, cap and seal member of a filler-port body are arranged in the order of assemblage.
Figure 4:
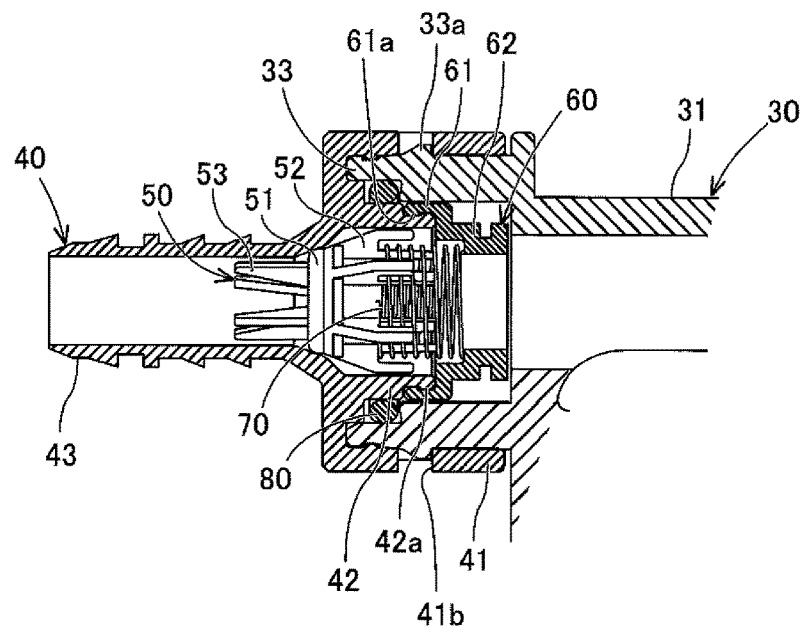
FIG. 4 is an enlarged cross-sectional diagram of a state where the tubular fit-in portion, joint, flow control valve, spring, cap and seal member of the filler-port body are assembled with each other.
Figure 5:
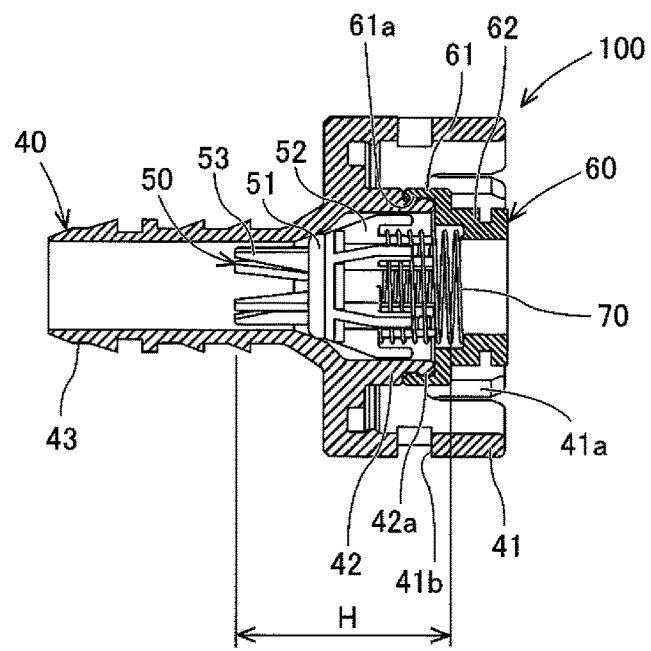
FIG. 5 is an enlarged cross-sectional diagram of a unit in which the joint, flow control valve, spring and cap are assembled with each other.

A detailed construction of the resinous filler port 12 will be hereinafter described with reference to FIGS. 2 through 5. As illustrated in FIG. 2, the resinous filler port 12 is made so as to enable the filler nozzle to be inserted into it, and is connected to the filler tube 13 and breather tube 23. The resinous filler port 12 comprises a filler-port body 30 made of resin, a joint 40 made of resin, a flow control valve 50 made of resin, a cap 60 made of resin, a spring 70 made of metal, and a seal member 80 made of rubber, as shown in FIGS. 2 through 4. In particular, the joint 40, the flow control valve 50, the cap 60, and the spring 70 make a one and only unit 100, as shown in FIG. 5.

As illustrated in FIG. 2, the filler-port body 30 includes a nozzle-insertion tubular portion 31, a filler-tube connector portion 32, and a tubular fit-in portion 33. The nozzle-insertion tubular portion 31 is provided with a nozzle insertion port 31a, into which the filler nozzle can be inserted, at one of the opposite ends. A not-shown filler cap is attached to the nozzle insertion port 31a of the nozzle-insertion tubular portion 31.

The filler-tube connector portion 32 is molded integrally at another one of the opposite ends of the nozzle-insertion tubular portion 31, and is formed so as to elongate from the nozzle-insertion tubular portion 31. The filler-tube connector portion 32 is formed so as to have a smaller diameter than the nozzle-insertion tubular portion 31 does. Moreover, the filler-tube connector portion 32 has the axial center that is located to deviate with respect to the axial center of the nozzle-insertion tubular portion 31.

The filler-tube connector portion 32 has an outer peripheral face that is formed as a bamboo shoot-like shape, namely, that is formed in multiple irregular shapes in the axial direction. The filler tube 13 is fitted around the filler-tube connector portion 32 onto the outer periphery. Since the filler tube 13 hooks onto the irregular faces on the outer peripheral face of the filler-tube connector portion 32, it is possible to inhibit the filler tube 13 from coming off from the filler-tube connector portion 32.

At the leading end, the filler-tube connector portion 32 is provided with a fuel supply port 32a for supplying a liquid fuel to the fuel tank 11. That is, the liquid fuel supplied from the filler nozzle is discharged from the fuel supply port 32a of the filler-port body 30, and is then supplied to the fuel tank 11 by way of the filler tube 13.

The tubular fit-in portion 33 is molded integrally at another one of the opposite ends of the nozzle-insertion tubular portion 31, and is formed so as to elongate from the nozzle-insertion tubular portion 31. To the tubular fit-in portion 33, the unit 100 and seal member 80 are attached undetachably. The tubular fit-in portion 33 is formed to have a diameter that is smaller than that of the nozzle-insertion tubular portion 31, and the diameter is smaller than that of the filler-tube connector portion 32. Moreover, the tubular fit-in portion 33 has the axial center that is located to deviate with respect to the axial centers of the nozzle-insertion tubular portion 31 and filler-tube connector portion 32.

The tubular fit-in portion 33 is provided with a plurality of locking bosses 33a and a plurality of positioning bosses 33b on the outer peripheral face, as shown in FIG. 3. On a leading-end side of the outer peripheral face in the tubular fit-in portion 33, the multiple locking bosses 33a are arranged at equal intervals in the circumferential direction. Moreover, the multiple locking bosses 33a are formed so as to extend in the circumferential direction. On a base-end side (i.e., on a side of the nozzle-insertion tubular portion 31) of the outer peripheral face in the tubular fit-in portion 33, the multiple positioning bosses 33b are arranged at equal intervals in the circumferential direction. Moreover, the multiple locking bosses 33b are formed so as to extend in the axial direction of the tubular fit-in portion 33. In addition, the multiple positioning bosses 33b are arranged in the circumferential direction to positionally deviate with respect to the positions where the multiple locking bosses 33a are located. Moreover, on the leading-end side, the tubular fit-in portion 33 is further provided with a vapor inlet port 33c for letting flow in vapors that arise from the fuel, and which pass through the breather tube 23 from a side of the fuel tank 11.

As illustrated in FIGS. 3 through 5, the joint 40 is formed to penetrate from one of the opposite ends to another one of the opposite ends, is fitted undetachably around the vapor inlet port 33c at the one of the opposite ends, and is connected with the breather tube 23 at the other one of the opposite ends. The joint 40 includes an outer cylinder 41, an inner cylinder 42, and a breather-tube connector portion 43.

At the one of the opposite ends of the joint 40 (i.e., on the right side in FIG. 3), the outer cylinder 41 is provided with a plurality of cut-offs 41a that are arranged at equal intervals in the circumferential direction. The multiple cut-offs 41a are formed so as to extend in the axial direction of the outer cylinder 41. Moreover, the outer cylinder 41 is further provided with a plurality of dents 41b that are located at positions away from the multiple cut-offs 41a in the axial direction, and which are arranged at equal intervals in the circumferential direction. Note that the multiple dents 41b are formed to positionally deviate with respect to the positions where the multiple cut-offs 41a are located.

As illustrated in FIG. 4, the outer cylinder 41 is fitted undetachably around the tubular fit-in portion 33 of the filler-port body 30. When the outer cylinder 41 is attached onto the tubular fit-in portion 33, the multiple positioning bosses 33b fit snugly in the multiple cut-offs 41a, and then the multiple locking bosses 33a are locked with the multiple dents 41b. In the state where the multiple locking bosses 33a are locked with the multiple dents 41b, the multiple locking bosses 33a and multiple dents 41b turn into a structure in which the multiple locking bosses 33a are inseparable from the multiple dents 41b. That is, a facing direction (or the normal direction) is formed between a locking face of the multiple locking bosses 33a and a locked face of the multiple dents 41b so as to coincide with a direction in which the outer cylinder 41 is fitted around the tubular fit-in portion 33.

The inner cylinder 42 is formed at the one of the opposite ends of the joint 40 (i.e., on the right side in FIG. 3), and is further formed coaxially with the outer cylinder 41 and as a substantially cylindrical shape. The inner cylinder 42 is located on a diametrically inner side of the outer cylinder 41 by way of a clearance. The clearance, into which the tubular fit-in portion 33 can be inserted, is formed at a diametrically interspace between the inner cylinder 42 and the outer cylinder 41. That is, the inner cylinder 42 is located on a diametrically inner side of the tubular fit-in portion 33. Moreover, the inner cylinder 42 is provided with an annular locking boss 42a on the outer peripheral face. In addition, the inner cylinder 42 is formed in a cylindrical shape on the inner peripheral face. The inner peripheral face of the inner cylinder 42 guides movements of a major-diameter portion 52 of the flow control valve 50.

The breather-tube connector portion 43 is formed at the other one of the opposite ends of the joint 40 (i.e., on the left side in FIG. 3), and is further formed coaxially with the outer cylinder 41 and inner cylinder 42. The breather-tube connector portion 43 has an inside diameter that is formed to be slightly smaller than an inside diameter that the inner cylinder 42 has. The breather-tube connector portion 43 guides movements of a minor-diameter portion 53 of the flow control valve 50. Moreover, at the opening edge on a side of the inner cylinder 42, the breather-tube connector portion 43 is capable of contacting with and separating away from a disked portion 51 of the flow control vale 50.

The breather-tube connector portion 43 has an outer peripheral face that is formed as a bamboo shoot-like shape, namely, that is formed in multiple irregular shapes in the axial direction. The breather tube 23 is fitted around an outer peripheral side of the breather-tube connector portion 43. Since the breather tube 23 hooks onto the irregular faces on the outer peripheral face of the breather-tube connector portion 43, it is possible to inhibit the breather tube 23 from coming off from the breather-tube connector portion 43.

As illustrated in FIGS. 3 through 5, the flow control valve 50 is accommodated inside the joint 40, and controls a flow volume of vapors that arise from the fuel, and which flow into the filler-port body 30 from the breather tube 23. In the interior of the joint 40, the flow control valve 50 is movable in distribution directions of the fuel vapors in compliance with pressures of the fuel vapors. Moreover, inside the joint 40, the flow control valve 50 controls the flow volume of the fuel vapors in compliance with its positions in the distribution directions of the fuel vapors. The flow control valve 50 includes the disked portion 51, the major-diameter portion 52 formed on one of the opposite-end sides beyond the disked portion 51, and the minor-diameter portion 53 formed on another one of the opposite-end sides beyond the disked portion 51.

The disked portion 51 has an outside diameter that is formed to be smaller than an inside diameter that the inner cylinder 42 has. The disked portion 51 is capable of moving over an inner-side region of the inner cylinder 42 in the axial direction. Moreover, the disked portion 51 is capable of contacting with an opening edge on a side of the inner cylinder 42 in the breather-tube connector portion 43, and is capable of separating away from the opening edge. That is, in a state where the disked portion 51 contacts with the opening edge, an inner-side region of the breather-tube connector portion 43, and the inner-side region of the inner cylinder 42 are divided to be put under a blocked or shielded condition to one another. On the other hand, in another state where the disked portion 51 separates away from the opening edge, the inner-side region of the breather-tube connector portion 43, and the inner-side region of the inner cylinder 42 communicate with one another. That is, the flow volume of vapors resulting from the fuel is controlled in compliance with positions of the disked portion 51.

The major-diameter portion 52 contacts with an inner peripheral face of the inner cylinder 42. That is, postures of the flow control valve 50 are regulated, because the major-diameter portion 52 is guided by the inner cylinder 42 when the flow control valve 50 is moving with respect to the joint 40 in the axial direction. Moreover, the minor-diameter portion 53 contacts with an inner peripheral face of the breather-tube connector portion 43. That is, the postures of the flow control valve 50 are further regulated, also because the minor-diameter portion 53 is guided by the breather-tube connector portion 43 as well when the flow control valve 50 is moving with respect to joint 40 in the axial direction. Moreover, the flow control valve 50 exhibits a movement range "H" (shown in FIG. 5) at least some of which is located on a diametrically inner side of the tubular fit-in portion 33. Specifically, the movement range of the major-diameter portion 52 of the flow control valve 50 is located partially on a diametrically inner side of the tubular fit-in portion 33.

As illustrated in FIGS. 3 through 5, the cap 60 is formed cylindrically, and is attached to an opening at one of the opposite ends of the joint 40. The cap 60 includes a major-diameter portion 61 provided with an inward claw 61a, and a minor-diameter portion 62 forming a stepped face between itself and the major-diameter portion 61. The major-diameter portion 61 is fitted around an outer peripheral side at some of the leading end of the inner cylinder 42. On this occasion, the inward claw 61a of the major-diameter portion 61 locks with the engagement boss 42a of the inner cylinder 42. The major-diameter portion 61 has an outside diameter that is made comparable to an outside diameter that the inner cylinder 42 has at the leading end. That is, between the major-diameter portion 61 and the outer cylinder 41, a clearance into which the tubular fit-in portion 33 can be inserted is formed. The minor-diameter portion 62 has an inside diameter that is formed smaller than the outside diameter that the major-diameter portion 52 of the flow control valve 50 has. That is, the cap 60 inhibits the flow control valve 50 from falling off from an opening at one of the opposite ends of the joint 40.

The spring 70 is arranged inside the inner cylinder 42 as well as inside the major-diameter portion 61 of the cap 60, and is further arranged in an axial interspace between the major-diameter portion 52 of the flow control valve 50 and an end face of the minor-diameter portion 62 of the cap 60.

The spring 70 carries out urging with respect to the flow control valve 50 in the axial direction, taking a position of the cap 60 as a standard. That is, an urging force of the spring 70 puts the disked portion 51 of the flow control valve 50 into a state of contacting with an opening edge of the breather-tube connector portion 43 on a side of the inner cylinder 42. Since a pressure of the fuel vapors in the breather tube 23 works against the urging force of the spring 70, the spring 70 undergoes compression, and then the disked portion 51 of the flow control valve 50 separates off away from the opening edge of the breather-tube connector portion 43.

The seal member 80 is an O-ring, for instance. The seal member 80 intervenes between an outer peripheral face of the inner cylinder 42 at the leading end and an inner peripheral face of the tubular fit-in portion 33, and contacts with the two in a pressed state. Therefore, the seal member 80 seals between the inner cylinder 42 and the tubular fit-in portion 33.

(3) Advantageous Effects

The resinous filler port 12 comprises the filler-port body 30, the joint 40, and the flow control valve 50. The filler-port body 30 is made of resin, and includes the nozzle insertion port 31a through which the filler nozzle is insertable, the fuel supply port 32a supplying a fuel supplied from the filler nozzle to the fuel tank 11 by way of the filler tube 13, and the vapor inlet port 33c letting flow in vapors arising from the fuel and passing through the breather tube 23 from a side of the fuel tank 11. The joint 40 is made of resin, and is formed to penetrate through from one of opposite ends thereof to another one of the opposite ends, is fitted undetachably into and around the vapor inlet port 33c at the one of the opposite ends, and is connected with the breather tube 23 at the other one of the opposite ends. The flow control valve 50 is accommodated inside the joint 40, and controls a flow volume of the vapors flowing into the filler-port body 30 from the breather tube 23.

The joint 40 is put into a state of accommodating in the interior the flow control valve 50 for adjusting a flow volume of the fuel vapors, and is then fitted integrally into and around the filler-port body 30. Thus, the resinous filler port 12 itself comprises the built-in flow control valve 50. Therefore, no dedicated or single-purpose distinct component part is needed at all, because it is unnecessary for a distinct member, which is different from members on a side of the fuel tank 11 and from the resinous filler port 12, to include the flow control valve 50.

Moreover, the joint 40 accommodating the flow control valve 50 therein is fitted undetachably into and around the vapor inlet port 33c of the filler-port body 30. That is, the joint 40 is connected with the breather tube 23, an independent or separate body, at one of the opposite ends, and the joint 40 is integral with the filler-port body 30 at another one of the opposite ends. Thus, the joint 40 is fitted undetachably around the filler-port body 30. Accordingly, compared with a construction in which the joint 40 is made detachable to and from the filler-port body 30, a component part equivalent to any retainer becomes unnecessary. Consequently, the number of component parts becomes less.

In addition, the filler-port body 30 includes the tubular fit-in portion 33 provided with the vapor inlet port 33c. In the interior of the joint 40, the flow control valve 50 is capable of moving in the distribution directions of the fuel vapors, in compliance with the pressures of the fuel vapors; and controls the flow volume of the fuel vapors, in compliance with its positions in the distribution directions. On this occasion, at least some of the movement range "H" of the flow control vale 50 is located on a diametrically inner side of the tubular fit-in portion 33.

That is, some of the movement range "H" of the flow control valve 50, and the tubular fit-in portion 33 are involved in an identical range in the axial direction. In other words, the movement range "H" of the flow control valve 50, and a fit-in range between the tubular fit-in portion 33 and the joint 40 exist within a predetermined range in the axial direction. Therefore, compared with a case where the flow control valve 50 and the tubular fit-in portion 33 exist at different positions in the axial direction, the resinous filler port 12 has a shortened axial-direction length at the site where it is connected with the breather tube 23.

Moreover, the joint 40 includes the outer cylinder 41, the inner cylinder 42, and the breather-tube connector portion 43. The outer cylinder 41 is formed at the one of opposite ends of the joint 40, and is fitted around an outer peripheral face of the tubular fit-in portion 33 that is located on a diametrically inner side of the joint 40. The inner cylinder 42 is formed at the one of the opposite ends of the joint 40, is located on a diametrically inner side of the outer cylinder 41 by way of a clearance, is located on a diametrically inner side of the tubular fit-in portion 33, and guides a movement of the flow control valve 50. The breather-tube connector portion 43 is formed at the other one of the opposite ends of the joint 40, and is fitted into the breather tube 23.

In this instance, the outer cylinder 41, which has a function of fitting around the tubular fit-in portion 33, and the inner cylinder 42, which has a function of guiding the flow control valve 50, are formed at distinct sites to one another. Note herein that sections, which fit around the tubular fit-in portion 33, might possibly deform when they fit around the tubular fit-in portion 33. In particular, since the inner cylinder 42 exists on an inner side of the tubular fit-in portion 33, the inner cylinder 42 demonstrates a function of regulating deformations of the tubular fit-in portion 33. Resulting from this as well, the outer cylinder 41 is a site where deformations are most likely to occur. That is, although the outer cylinder 41 is likely to be deformed by fitting the tubular fit-in portion 33 thereinto, the inner cylinder 42 is not deformed at all by fitting the tubular fit-in portion 33 therearound. Therefore, the inner cylinder 42 can guide the flow control valve 50 highly accurately. That is, since it is possible to maintain the postures of the flow control valve 50, it is possible to control the flow volume of the fuel vapors highly accurately.

Moreover, the resinous filler port 12 further comprises the seal member 80. The seal member 80 is interposed between an outer peripheral face of the inner cylinder 42 and an inner peripheral face of the tubular fit-in portion 33. Thus, the fuel vapors can be sealed securely when the fuel vapors distribute from the interior of the joint 40 to the tubular fit-in portion 33. In addition, since the seal member 80 is arranged between the inner cylinder 42, which is less likely to deform, and the tubular fit-in portion 33, high sealing performance can be demonstrated.

The resinous filler port 12 further comprises the cap 60. The cap 60 is attached to an opening at the one of opposite ends of the joint 40 to inhibit the flow control valve 50 from falling off from the opening at the one of the opposite ends of the joint 40. Moreover, the joint 40, the flow control valve 50, and the cap 60 construct the one and only unit 100 to be fitted into and around the vapor inlet port 33c. That is, in a state prior to being attached to the filler-port body 30, the unit 100 makes a one and single component part that has the built-in flow control valve 50. Therefore, when carrying out a functional inspection of the flow control valve 50, it is possible to carry it out to the unit 100 serving as a simple body. As a result, the inspection efficiency can be upgraded remarkably, because of being a small size compared with a case where the inspection is carried out to the resinous filler port 12 as a whole.

What is claimed is:

1. A resinous filler port comprising:
   a filler-port body made of resin, and comprising:
      a nozzle insertion port through which a filler nozzle is insertable,
      a fuel supply port supplying a fuel supplied from the filler nozzle to a fuel tank by way of a filler tube,
      a vapor inlet port letting flow in vapors arising from the fuel and passing through a breather tube from a side of the fuel tank, and
      a tubular fit-in portion provided with the vapor inlet port;
   a joint made of resin, and formed to penetrate through from one of opposite ends thereof to another one of the opposite ends, fitted into and around the vapor inlet port at the one of the opposite ends, and connected with the breather tube at the other one of the opposite ends; and
   a flow control valve accommodated inside the joint, and controlling a flow volume of the vapors flowing into the filler-port body from the breather tube;
   wherein the joint comprises:
      an outer cylinder formed at the one of opposite ends of the joint and fitted around an outer peripheral face of the tubular fit-in portion that is located on a diametrically opposed inner side of the joint,
      an inner cylinder formed at the one of the opposite ends of the joint located on a diametrically opposed inner side of the outer cylinder by way of a clearance located on a diametrically opposed inner side of the tubular fit-in portion and guiding a movement of the flow control valve, and
      a breather-tube connector portion formed at the other one of the opposite ends of the joint and fitted into the breather tube; and
   wherein:
      the tubular fit-in portion is inserted into the clearance between the outer cylinder and the inner cylinder,
      the tubular fit-in portion comprises at least one locking boss on the outer peripheral face to fix the joint around the vapor inlet port,
      the joint comprises at least one dent or through-hole engaging with the locking boss to fix the joint around the vapor inlet port, and penetrating through the outer peripheral face of the joint,
      the resinous filler port further comprises a seal member interposed between an outer peripheral face of the inner cylinder and an inner peripheral face of the tubular fit-in portion, and
      the seal member is arranged at the clearance between the outer cylinder and the inner cylinder.

2. The resinous filler port according to claim 1, wherein:
   the flow control valve is movable in an interior of the joint in a distribution direction of the vapors in compliance with a pressure of the vapors, and controls a flow volume of the vapors in compliance with a position thereof in the distribution direction; and
   at least some of a movement range of the flow control valve is located on a diametrically inner side of the tubular fit-in portion.

3. The resinous filler port according to claim 1 further comprising a cap attached to an opening at the one of opposite ends of the joint to inhibit the flow control valve from falling off from the opening at the one of the opposite ends of the joint, wherein:
   the joint, the flow control valve, and the cap make a unit to be fitted into and around the vapor inlet port.

4. The resinous filler port according to claim 1, wherein:
   the joint is fitted into and around the vapor inlet port by locking.

5. The resinous filler port according to claim 1, wherein:
   the seal member is disposed in an axial fit-in range between the tubular fit-in portion and the outer cylinder.

6. The resinous filler port according to claim 1, wherein:
   the outer cylinder comprises the at least one dent in an inner peripheral face thereof to fix the joint around the vapor inlet port.

7. The resinous filler port according to claim 1, wherein:
   the outer cylinder comprises the at least one dent in an inner peripheral face thereof to fix the joint around the vapor inlet port.

* * * * *